Dec. 23, 1952     I. PETRELLI ET AL     2,622,931
ROLLER SKATE WHEEL MOUNTING
Filed Oct. 16, 1947
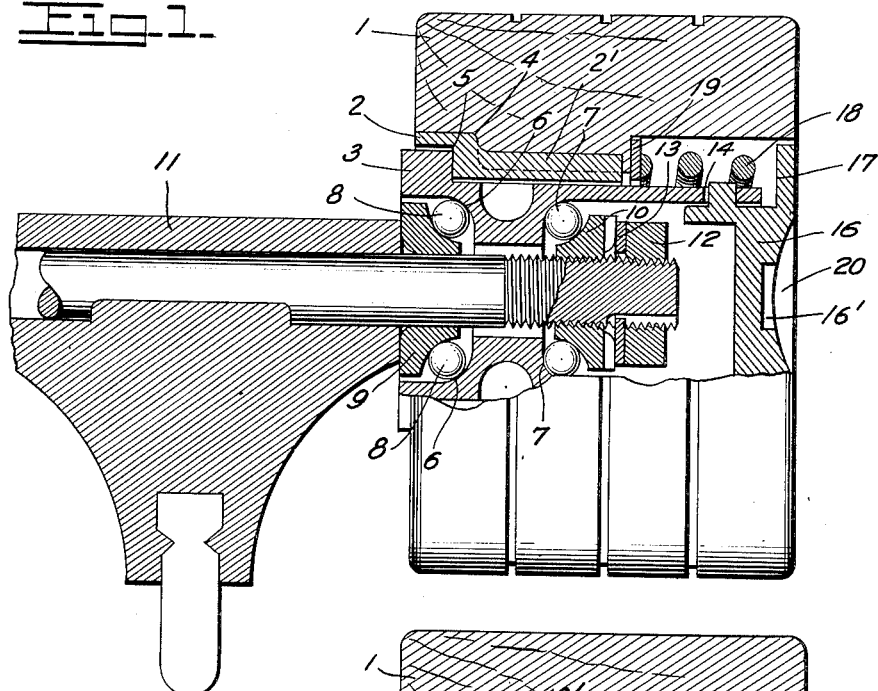
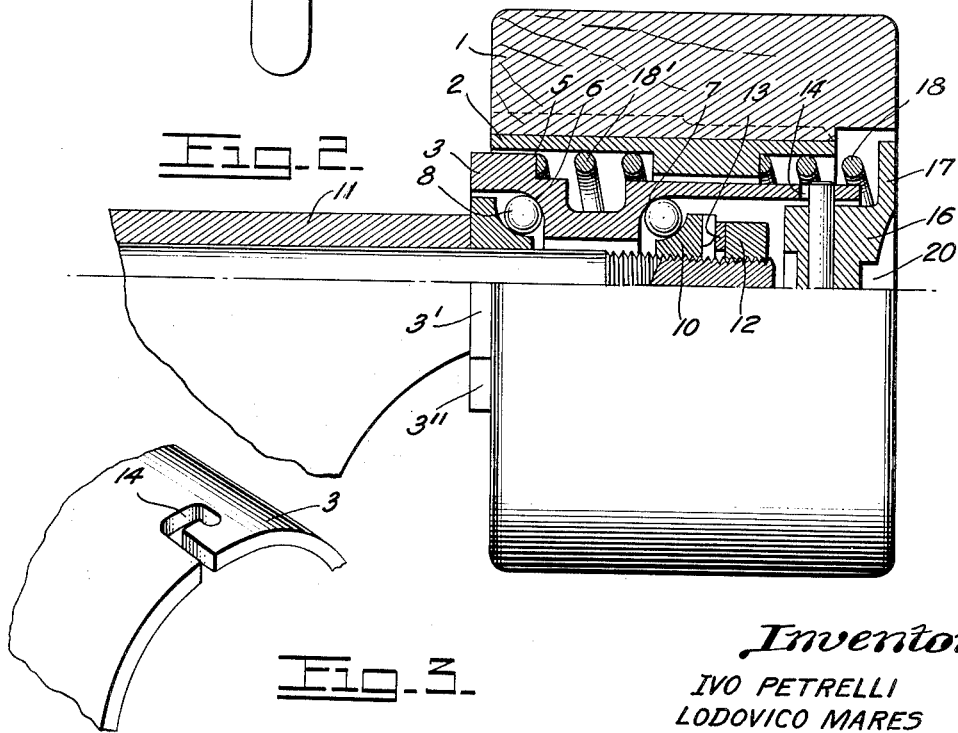
Inventor
IVO PETRELLI
LODOVICO MARES
BY Haseltine Lake & Co.
AGENTS

UNITED STATES PATENT OFFICE 2,622,931

ROLLER-SKATE WHEEL MOUNTING

Ivo Petrelli, Milan, and Lodovico Mares,
Rapallo, Italy

Application October 16, 1947, Serial No. 780,150
In Italy October 25, 1946

3 Claims. (Cl. 301—5.7)

The present invention relates to the mountings of wheels or rollers of roller-skates.

It is well known that on roller-skates, particularly those designed for use in competitions and like purposes, wheels of a relatively soft material, e. g. wood, are very generally employed, and which are therefore subjected to a rapid wear and possible breakages. In consequence, it is necessary that the said wheels can be readily and easily replaced, even during the course of a competition.

Moreover, it is known that all conventional types of roller-skate wheels are produced by systems which do not ensure a perfect centering of the ball races with respect to the wheel periphery, since the said pieces are machined separately and then assembled through various procedures which are not sufficiently accurate to ensure a very exact centering.

It is also known that all roller-skate wheels are rigidly fixed on their shafts so that, especially while taking a curve, an undue lateral skidding can take place, which represents a peculiarity of roller skating and which causes a great deal of wear and a more intense static and dynamic stressing of all the parts of the roller-skate.

The present invention removes all the above mentioned disadvantages, at the same time ensuring a ready replacement of the wheels, a perfect centering of the same with respect to their axes, and allowing a certain amount of axial displacement which is counter-acted by a resilient means acting as a damper during the lateral movement of the skate, and also reducing the wear on the wheels. This is attained, according to this invention, by having recourse to the following means:

(i) Fitting to the wheel a fixed metal bush in such a manner as to allow a further machining, thereby to give to the wheel an exact basis for final centering of the finished wheel.

(ii) Arrangement of the cone and ball bearing, or other bearing, in such a manner as to permit the manipulation of the parts whilst preventing unintentional displacement thereof while replacing a wheel.

(iii) Total enclosing of all the parts within the hub, so that the rolling members are wholly protected against dust etc.

(iv) Assembling of the wheel on the hub by means such that, through a suitable locking action, inward movement of the wheel will be prevented, at the same time preventing a relative rotation; that is to say, the wheel becomes rigidly locked in angular direction with respect to the hub.

(v) Fitting of the wheel on the hub through the interposition of, at least, one spring, obtaining by such means a lateral damping action of axial displacements of the wheel.

The above essential features, together with other and further objects of this invention, will be explained in the following description and with reference to the accompanying drawing, in which two forms of embodiment of the invention are shown.

In the drawings, Figs. 1 and 2 show axial sections of a wheel, according to two forms of embodiment, and Fig. 3 is a fragmentary perspective view of one of the parts.

As will be seen from Figure 1, when it is necessary to so reinforce the material of which the wheel is composed, the wheel is provided with a metal bush which is pressed into the bore roughly machined in the wheel, and the secure inter-engagement between the wheel 1 and the bush 2 is ensured by the provision of suitable ribs or splines on the bush or by serrations formed on the periphery thereof, as indicated at 2'. The bore of the bush is turned out so as to adapt itself with great precision on the wheel hub 3, according to a precise rotating fit; the wheel is then suitably machined, making it perfectly concentric with respect to the bore of the bush, and so also with the hub and the wheel spindle. Said bush 2 is provided with a shoulder 4 against which the wheel rests, and an inner shoulder 5 against which the hub 3 rests; the wheel 1 is located by means of such shoulders which also prevent any displacement whatever of the said wheel towards the centre of the skate and, therefore, of the foot of the user.

To obtain a locking of the hub with respect to the bush, and so to the wheel, recourse can be made to various systems. One of such systems resides in providing the hub with projections which engage themselves into corresponding recesses machined on the annular seating of the bush. Such an arrangement could conveniently be reversed so that the annular seating of the bush is provided with projections while the corresponding recesses are machined in the hub.

However, a preferred embodiment consists in giving to the hub rim an hexagonal shape, thereby providing flat lateral faces 3', 3'', and also shaping the bush seating in a similar manner, obtaining in such a way a wheel locking engagement.

The one-piece wheel hub is cylindrically shaped (except for the hexagonal rim) and is provided with a pair of opposite races 6 and 7 for the balls 8 which are confined by the two cones 9 and 10, the one of which is fixed and keyed on to the wheel spindle 11, while the other is adjustably screwed on to the said shaft, by means of a fine thread, fulfilling in such a manner the function of a locking device. The final locking is obtained by means of a lock nut 12, provided with a washer 13. Since the hub, after having been fitted and adjusted, needs no further manipulations, it is obvious that on the said hub can be mounted the two ball bearings, removing in such a manner all adjustment and mounting difficulties which were heretofore encountered in the application of ball bearings to roller skate wheels.

The locking of the wheel on the hub, with the purpose of preventing any outward movement of said wheel, is attained in the following manner. The cylindrical wall of the hub has a pair of diametrically opposed bayonet notches 14, which are engaged by a pair of pins 15 integral with the outer closure cover 16, against the external flange 17 of which the spiral spring 18 bears, the opposite and inner end of the said spring resting against the wooden wheel 4 or, more precisely, against a metal washer 19 carried on the radial face of the recessed wheel and which prevents wear on said radial face during use. The cover 16 is provided with a screw-driver slot 16' for its operation. For the purposes of this invention, it is of no importance if the pins 15 project from the cover inwardly of the hub or, conversely, if the cover is fitted inwardly with respect to the hub, while the pins project outwardly therefrom (as in the example shown in the drawing).

The assembling and dismantling of the wheel can be effected very quickly, since it requires only a pressure on the cover in order to engage the pins 15 into the bayonet notches 14, and a subsequent small rotary motion in order to lock the wheel on the hub. In such a manner, the spiral spring 18 is also compressed, so that the wheel cannot be driven out of its hub.

However, when said spring is submitted to a greater compression, it is possible for the wheel to perform a small axial displacement; at any rate, said wheel is always forcibly restored to its normal position by the spring 18. Through this peculiar feature, a resilient damping of the lateral displacement of the wheel is attained, with an action similar in effect to the lateral deformation of motor car tyres, especially when negotiating a curve. The said damping effect can be attained in a more complete manner through the form shown in Figure 2, in which between the adjacent opposite surfaces of the body 3 and of the body 2, a second spring 18' is interposed, with the purpose to counteract, through its resilient action, not only the pressure towards the outside but also the pressure towards the inside, so that all eight wheels of the pair of skates are put in a condition to co-operate in the absorption of lateral pressures, and particularly of the pressure caused by the centrifugal force due to negotiating a curve.

A wholly analagous result can be obtained even by employing only a single spring 18 provided that the ends of the said spring be suitably secured to the members which show a lateral play, the one with respect to another.

Another advantage which can be attained through this invention consists in that the diameter of the cones can be increased, in order to completely dustproof the wheel, without the employment of the so-called "dust covers" applied to the inside surfaces of the wheels.

Since several changes might be accomplished in the above-mentioned arrangement of the invention, without departing from the scope thereof, it will be understood that what has been previously described and shown in the accompanying drawing discloses merely one and a preferred form of construction of carrying the invention into effect.

What we claim is:

1. In a roller-skate wheel mounting the combination of a spindle fixedly secured to the skate; a hub rotatable on the spindle in anti-friction engagement therewith; a rolling element mounted on the hub for rotation therewith comprising a body portion having a bore therein, and a bush closely fitting inside the bore and slidable axially on the hub, the bush and hub having complementary parts inhibiting relative rotation, the bush having an internal shoulder and the hub an external shoulder cooperating therewith to limit inward axial movement of the rolling element of the hub; said rolling element body having a hollowed out portion, said hub extending beyond the bush into the hollowed out portion, a coil spring surrounding the hub and located in the hollowed out portion and a cover closing the hollowed out portion and having a releasable engagement with the hub, the spring abutting against the cover and the end surface of the hollowed out portion to resist outward axial movement of the rolling element.

2. A roller-skate mounting as claimed in claim 1 wherein the bush includes an intermediate portion having a close sliding fit on the cylindrical wall of the hub and defining an annular space in the bush and a second coil spring interposed between said intermediate portion and the shoulder of the hub thereby resiliently to resist inward axial displacement of the wheel.

3. A roller-skate mounting as claimed in claim 1 wherein the cover includes a radial pin and wherein the hub is provided with an L-shaped slot extending axially to the outer end of the hub and adapted to receive the said pin.

IVO PETRELLI.
LODOVICO MARES.

REFERENCES CITED

The following references are of record in the file of this patent:

UNITED STATES PATENTS

| Number | Name | Date |
| --- | --- | --- |
| 1,554,298 | Schoettler | Sept. 22, 1922 |
| 1,803,019 | Holm | Apr. 28, 1931 |
| 2,136,531 | Vogt | Nov. 15, 1938 |
| 2,241,684 | Ware | May 13, 1941 |
| 2,304,944 | Martinec | Dec. 15, 1942 |
| 2,357,597 | Martinec | Sept. 5, 1944 |
| 2,467,437 | Martinec | Apr. 19, 1949 |